US007389238B2

(12) United States Patent
Sansone et al.

(10) Patent No.: US 7,389,238 B2
(45) Date of Patent: Jun. 17, 2008

(54) RECIPIENT ELECTED MESSAGING SERVICES

(75) Inventors: Ronald P. Sansone, Weston, CT (US); Robert A. Cordery, Danbury, CT (US); Donald G. Mackay, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 1014 days.

(21) Appl. No.: 09/818,792

(22) Filed: Mar. 27, 2001

(65) Prior Publication Data

US 2002/0143430 A1 Oct. 3, 2002

(51) Int. Cl.
*G06Q 10/00* (2006.01)

(52) U.S. Cl. ........................................................ 705/1

(58) Field of Classification Search ................. 705/400, 705/401, 408, 404, 410, 60, 1; 209/584, 209/900; 709/1, 206
See application file for complete search history.

(56) References Cited

U.S. PATENT DOCUMENTS

| | | | | |
|---|---|---|---|---|
| 4,037,956 | A | 7/1977 | McKeen, Jr. | |
| 4,962,532 | A | 10/1990 | Kasiraj et al. | |
| 5,031,223 | A | 7/1991 | Rosenbaum et al. | |
| 5,079,714 | A | 1/1992 | Manduley et al. | |
| 5,086,300 | A | 2/1992 | Ashmore | |
| 5,115,326 | A | 5/1992 | Burgess et al. | |
| 5,293,250 | A | 3/1994 | Okumura et al. | |
| 5,400,335 | A | 3/1995 | Yamada | |
| 5,612,889 | A | 3/1997 | Pintsov et al. | 364/478.14 |
| 5,636,038 | A | 6/1997 | Lynt et al. | |
| 5,648,916 | A | 7/1997 | Manduley | 364/514 A |
| 5,737,729 | A | 4/1998 | Denman | |
| 5,754,671 | A * | 5/1998 | Higgins et al. | 382/101 |

(Continued)

FOREIGN PATENT DOCUMENTS

| | | | |
|---|---|---|---|
| CA | 1178711 | A | 11/1984 |

(Continued)

OTHER PUBLICATIONS

Unknown author, "Sharp extends fax line with scan-to-e-mail feature", Nov. 16, 2000, Purchasing, vol. 129 Issue 9, p. 174, 1/3 p. 1c.*

(Continued)

*Primary Examiner*—Thomas A. Dixon
(74) *Attorney, Agent, or Firm*—Ronald Reichman; Angelo N. Chaclas

(57) ABSTRACT

A method that enables the recipient to receive notification of the letter mail, flats and/or packages (mail) that the recipient is going to receive prior to the delivery of the mail. The recipient is then able to inform a post or courier e.g., Federal Express®, Airborne®, United Parcel Service®, DHL®, etc. of the manner in which the recipient would like the mail delivered. The post and courier hereinafter will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the post e-mail or fax the contents of the envelope to the recipient and/or parties designated by the recipient.

35 Claims, 8 Drawing Sheets

U.S. PATENT DOCUMENTS

| | | | |
|---|---|---|---|
| 5,790,790 | A | 8/1998 | Smith et al. |
| 5,825,865 | A | 10/1998 | Oberlander et al. |
| 5,838,768 | A | 11/1998 | Sumar et al. .................. 379/89 |
| 5,862,223 | A | 1/1999 | Walker et al. |
| 5,872,926 | A | 2/1999 | Levac et al. |
| 5,943,408 | A | 8/1999 | Chen et al. |
| 5,944,786 | A | 8/1999 | Quinn |
| 5,974,449 | A | 10/1999 | Chang et al. |
| 5,987,508 | A | 11/1999 | Agraharam et al. |
| 6,020,980 | A | 2/2000 | Freeman |
| 6,044,362 | A | 3/2000 | Neely |
| 6,047,272 | A | 4/2000 | Biliris et al. |
| 6,052,442 | A | 4/2000 | Cooper et al. |
| 6,058,420 | A | 5/2000 | Davies |
| 6,061,448 | A | 5/2000 | Smith et al. |
| 6,061,790 | A | 5/2000 | Bodnar |
| 6,064,995 | A | 5/2000 | Sansone et al. |
| 6,072,862 | A | 6/2000 | Srinivasan ............. 379/100.08 |
| 6,073,165 | A | 6/2000 | Narasimhan et al. |
| 6,081,899 | A | 6/2000 | Byrd |
| 6,085,231 | A | 7/2000 | Agraharam et al. |
| 6,108,688 | A | 8/2000 | Nielsen |
| 6,259,533 | B1 | 7/2001 | Toyoda et al. |
| 6,273,267 | B1 * | 8/2001 | Tamamoto et al. .......... 209/546 |
| 6,285,777 | B2 * | 9/2001 | Kanevsky et al. ........... 358/402 |
| 6,289,323 | B1 | 9/2001 | Gordon et al. |
| 6,293,037 | B1 | 9/2001 | Spada et al. |
| 6,321,211 | B1 | 11/2001 | Dodd |
| 6,333,973 | B1 | 12/2001 | Smith et al. |
| 6,343,327 | B2 | 1/2002 | Daniels, Jr. et al. |
| 6,347,305 | B1 | 2/2002 | Watkins |
| 6,390,921 | B1 | 5/2002 | Busch et al. |
| 6,405,319 | B1 | 6/2002 | Arnold et al. |
| 6,411,393 | B1 | 6/2002 | Wakasugi |
| 6,427,164 | B1 | 7/2002 | Reilly |
| 6,434,603 | B1 | 8/2002 | Tsuji et al. |
| 6,459,364 | B2 | 10/2002 | Gupta |
| 6,527,170 | B1 | 3/2003 | Gordon et al. |
| 6,527,178 | B1 | 3/2003 | Gordon et al. |
| 6,532,489 | B1 | 3/2003 | Merchant |
| 6,542,584 | B1 | 4/2003 | Sherwood et al. |
| 6,549,612 | B2 | 4/2003 | Gifford et al. |
| 6,604,132 | B1 | 8/2003 | Hitt |
| 6,621,892 | B1 | 9/2003 | Banister et al. |
| 6,647,385 | B2 | 11/2003 | Seestrom et al. |
| 6,697,858 | B1 | 2/2004 | Ezerer et al. |
| 6,710,894 | B1 | 3/2004 | Ogawa |
| 6,711,154 | B1 | 3/2004 | O'Neal |
| 6,721,784 | B1 | 4/2004 | Leonard et al. |
| 6,741,724 | B1 | 5/2004 | Bruce et al. |
| 6,785,710 | B2 | 8/2004 | Kikinis |
| 6,842,772 | B1 | 1/2005 | Delaney et al. |
| 2001/0021261 | A1 | 9/2001 | Koga et al. |
| 2002/0002590 | A1 * | 1/2002 | King et al. .................. 709/206 |
| 2002/0042808 | A1 * | 4/2002 | Smith et al. .................... 709/1 |
| 2002/0095306 | A1 * | 7/2002 | Smith et al. .................... 705/1 |
| 2002/0165729 | A1 | 11/2002 | Kuebert et al. |

FOREIGN PATENT DOCUMENTS

| | | | | |
|---|---|---|---|---|
| DE | 1974561 | | | 11/1999 |
| EP | 0 375 139 | A2 | | 11/1989 |
| EP | 0465011 | A2 | * | 1/1992 |
| EP | 1063602 | A1 | * | 12/2000 |
| WO | WO 99/21330 | | | 10/1998 |
| WO | WO 02/01434 | A1 | * | 1/2002 |
| WO | WO 02/42979 | A1 | * | 5/2002 |

OTHER PUBLICATIONS

Hoffman et al, "Couriers deliver new net services", Jan. 6, 1997, 2 pages, Computerworld, v31, n1.*

Pitney Bowes Inc. Software Solutions regarding ReUnion™ Data Quality to a New Level dated 1998.

Pitney Bowes Inc. Software Solutions regarding Final Focus™ Your Single Source for Geographic, Demographic and Lifestyle Information dated 1998.

The Session Initiation Protocol: Internet-Centric Signaling—Schulzrinne, et al. (2000); www.cs.columbia.edu/jdrosen/papers/commag_final.pdf.

TURMS: A Non-invasive Certified Email System—Nita Rotaru; www.cnds. jhu.edu/-crisn/papers/turms.ps.gz.

EmailValet: Learning User Preferences for Wireless Email—Mackassy, Dayanik, Hirsh (1999); www.ai.cs.uni-dortmund.de/EVENTS/IJCA199-MLIF/papers/macscassy.ps.gz.

Formal Development of Secure Email—Shou, Kuo, Older, Chin (1999); web.syr.edu/-dzhou/papers/hicss99.ps.gz.

Practical Protocols For Certified Electronic Mail—Deng, Gong, Lazar, Wang (1996); java.sun.com/people/gong/papers/certified-email.ps.gz.

POST: A secure, resilient, cooperative messaging system—Alan Mislove Ansley; www.usenix.org/events/hotos03/tech/full_papers/mislove/mislove.pdf.

Formal Analysis of a Secure Communication Channel: Secure..-Dan Zhou; ocelot.cat.syr.edu/-danzhou/papers/fm99.ps.

www.PeopleFinderNow.com, Skip Tracing and People Locates, pp. 1-6.

Pace, Andrew "It's A Matter of Privacy", Jun. 2001, The Gale Group.

Wattendorf, George, "Stalking Investigation Strategies", Mar. 2000, FBI Law Enforcement Bulletin, Dialog No. 04717583.

Graham, Robert, Carnivore FAQ (Frequently Asked Questions), www.robertgraham.com/pubs/carnivore-faq.html.

An Efficient Implementation Scheme of Concurrent Object-Oriented Languages on Stock Multicomputers—Taura et al. (1993): fto.vl.is.s.u-tokvo.ac.ip/pub/papers/opopp93-multicomputer-letter.ps.oz.

Pin-down Cache: A Virtual Memory Management Technique for Zero-copy Communication—Tezuka, et al. (1998); www.rwcp.or.jp/prn/../papers/tr97006.ps.gz.

Linux Magazine I Jul. 1999 I FEATURES I Secrets Inside the Linux Kernel Revealed; www.linux-mag.com/1999-07/kernel_03.html.

TURMS: A Non-invasive Certified Email System—Nita Rotaru; www.cnds. jhu.edu/-crisn/papers/turms.ps.gz, 2001.

POST: A secure, resilient, cooperative messaging system—Alan Mislove Ansley; www.usenix.org/events/hotos03/tech/full_papers/mislove/mislove.pdf, 2003.

Formal Analysis of a Secure Communication Channel: Secure..-Dan Zhou; ocelot.cat.syr.edu/-danzhou/papers/fm99.ps, 2004.

www.PeopleFinderNow.com, Skip Tracing and People Locates, pp. 1-6., date unknown.

Graham, Robert, Carnivore FAQ (Frequently Asked Questions), www.robertgraham.com/pubs/carnivore-faq.html, 2001.

* cited by examiner

RECIPIENT ELECTED MESSAGING SERVICES

CROSS REFERENCE TO RELATED APPLICATIONS

Reference is made to commonly assigned patent application Ser. No. 09/818,721 filed herewith entitled "Sender Elected Messaging Services" in the names of Ronald P. Sansone, Robert A. Cordery and Donald G. Mackay; Ser. No. 09/817,998 filed herewith entitled "Messaging Services For The Visually Impaired" in the name of Ronald P. Sansone; Ser. No. 09/818,800 filed herewith entitled "Messaging Services For Uniquely Identified Mail"; Ser. No. 09/818,480 filed herewith entitled "Recipient Elected Messaging Services For Mail That Is Transported In Trays Or Tubs" in the name of Ronald P. Sansone; Ser. No. 09/818,195 filed herewith entitled "Method For Determining If Mail Contains Life Harming Materials" in the name of Ronald P. Sansone; and Ser. No. 09/818,277 filed herewith entitled "Method For A Carrier To Determine The Location Of A Missing Person" in the name of Ronald P. Sansone.

FIELD OF THE INVENTION

The invention relates generally to the field of mail delivery systems and more, particularly, to systems that may deliver mail by physical and/or electronic means.

BACKGROUND OF THE INVENTION

People have directly transmitted information from one person to another. Information was first transmitted by spoken words and later by written words. Writings enabled people to transmit information by messengers from a location in which the sender of the writing was present to another location where the receiver was present. In time, postal services were developed in which a person would deliver letters to the post office in one city and an agent of the post office would deliver that letter to a post office in another city, where the letter mail would be picked up by the person to whom the letter was sent.

Ever since the numeric codification of streets and buildings received general acceptance, an individual's name and household postal address have been linked. The sender of a letter or package would deliver a letter or package to the post that had the correct recipient postal address, and the post would deliver the letter or package to the numeric street address of the recipient of the letter or package. A correct recipient postal address for the delivery of the letter or package to the recipient included: the name of the recipient; the street address of the recipient; the city and state of the recipient; and the zip code of the recipient. Thus, the correct recipient postal address is usually the actual location of the recipient.

Typically, it takes the post three to five days to deliver letters and/or packages to a recipient. Sometimes, recipients of letters and packages like to know what letters and packages they are going to receive before they receive them. For instance, if someone is going on a trip, they may want to receive their bills, e.g., credit card, electric, gas, oil, hospital, doctor, etc. before they leave on the trip so that they may pay the bills before a finance charge for late payment of the bill is applied to their account. Someone may also want to receive a package before they go on a trip so that they may take the contents of the package on the trip. The recipient may also want to delay delivery of a particular letter or package until they return from their trip. The reason for the foregoing may be that the recipient does not want to retrieve the letter or package at the post office or have the letter or package waiting at a vacant house.

SUMMARY OF THE INVENTION

This invention overcomes the disadvantages of the prior art by providing a method that enables a receiver or receiver's agent (hereinafter "recipient") to obtain notification of the letters, flats and/or packages (mail) that the recipient is going to receive prior to the delivery of the mail. The recipient is then able to inform a post or courier e.g., Federal Express®, Airborne, ® United Parcel Service®, DHL®, etc. of the manner in which the recipient would like the mail delivered. The post and courier, hereinafter, will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the carrier e-mail or fax the contents of the mailpiece to the recipient and/or parties designated by the recipient.

This invention accomplishes the foregoing by: depositing with the carrier mail containing the recipient's name and physical address and the sender's name and physical address; capturing the name and physical address of the recipient and the sender; translating the name and physical address of the recipient into an e-mail address; notifying the recipient via e-mail of the availability of the deposited mail; notifying the carrier via e-mail of the manner in which the recipient would like the mail delivered; and delivering mail to the recipient in the manner specified by the recipient to the carrier.

DETAILED DESCRIPTION OF THE PREFERRED EMBODIMENT

Figure 1A:
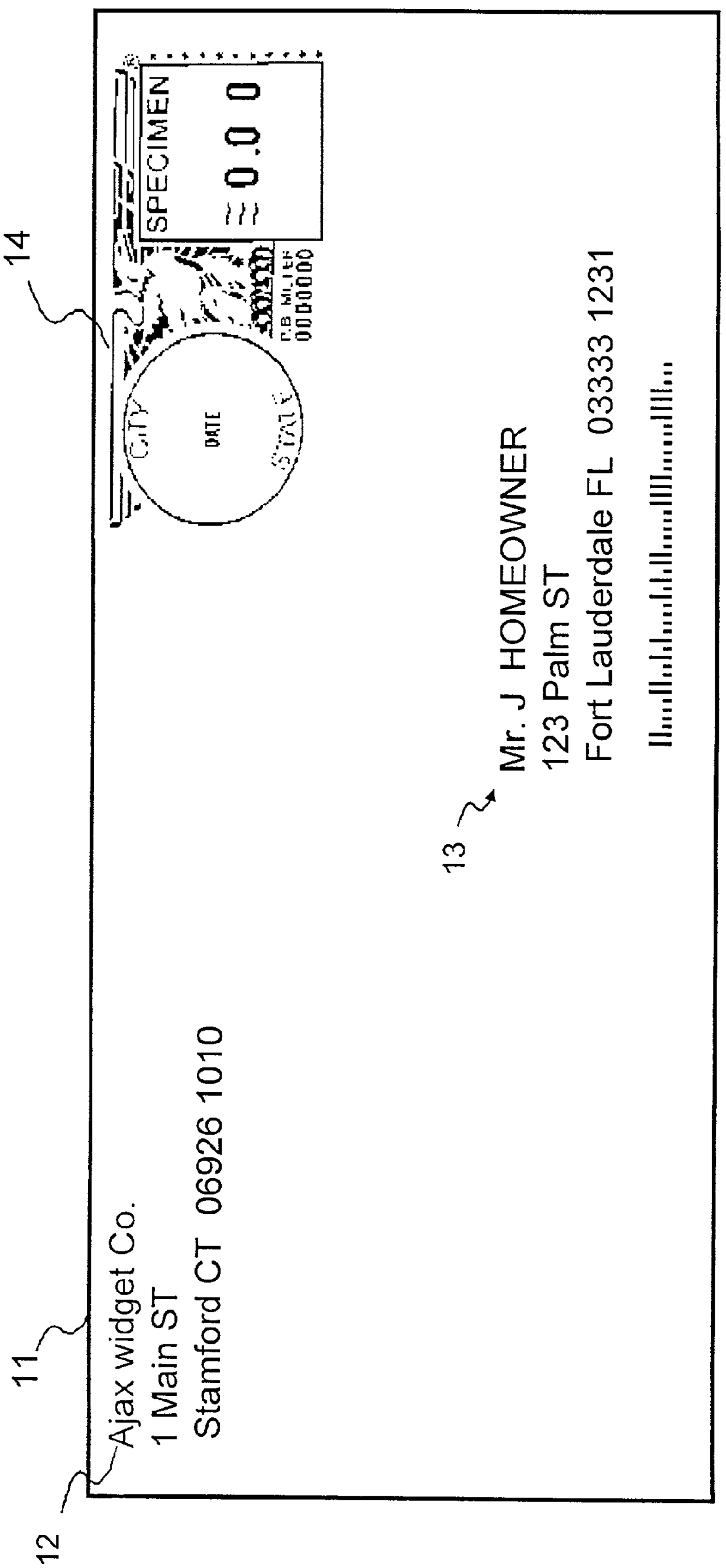
FIG. 1A is a drawing of a metered mailpiece.

Referring now to the drawings in detail and more particularly to FIG. 1A, the reference character 11 represents a mailpiece that has a sender address field 12, a recipient address field 13 and a postal indicia 14.

Figure 1B:
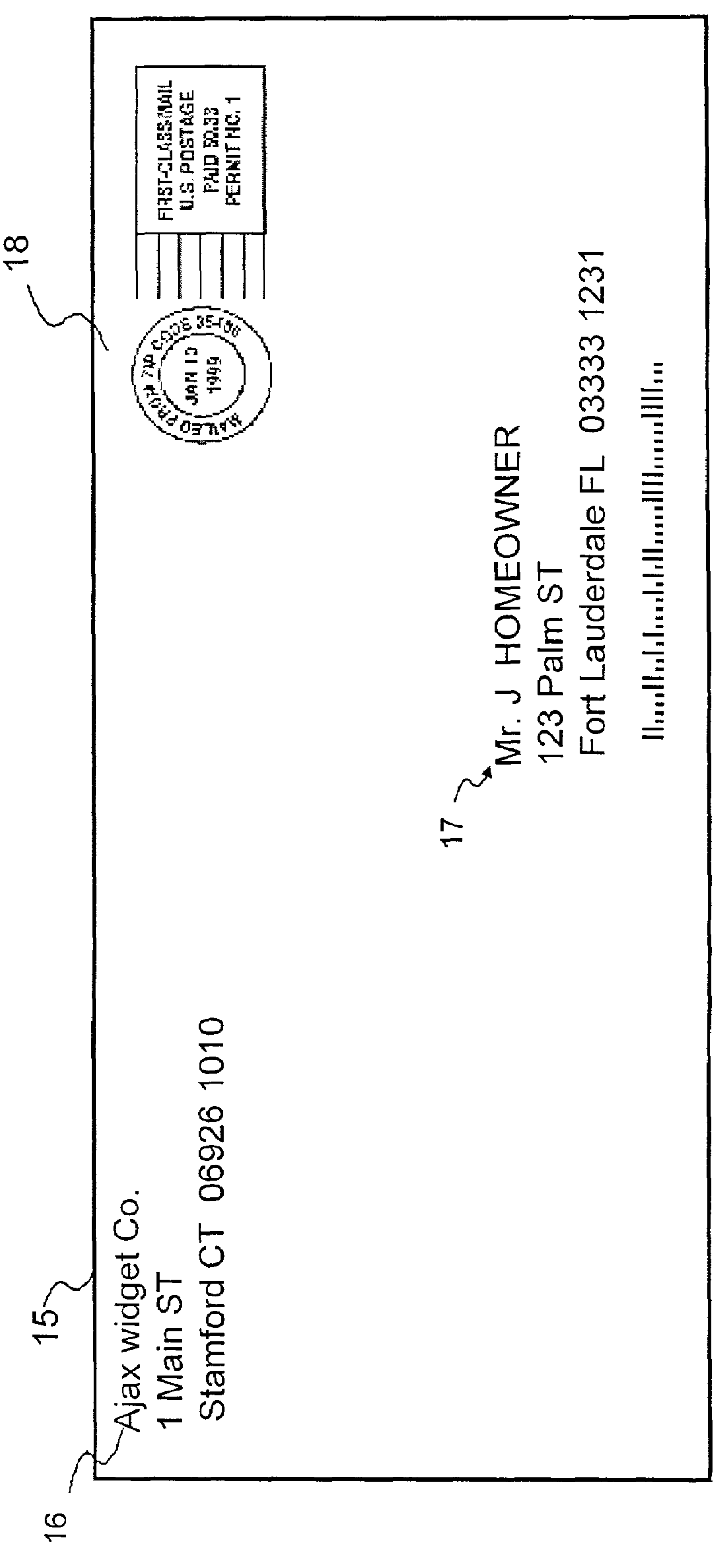
FIG. 1B is a drawing of a permit mailpiece.

FIG. 1B is a drawing of a permit mailpiece. Mailpiece 15 has a sender address field 16, a recipient address field 17 and a permit 18.

Figure 1C:
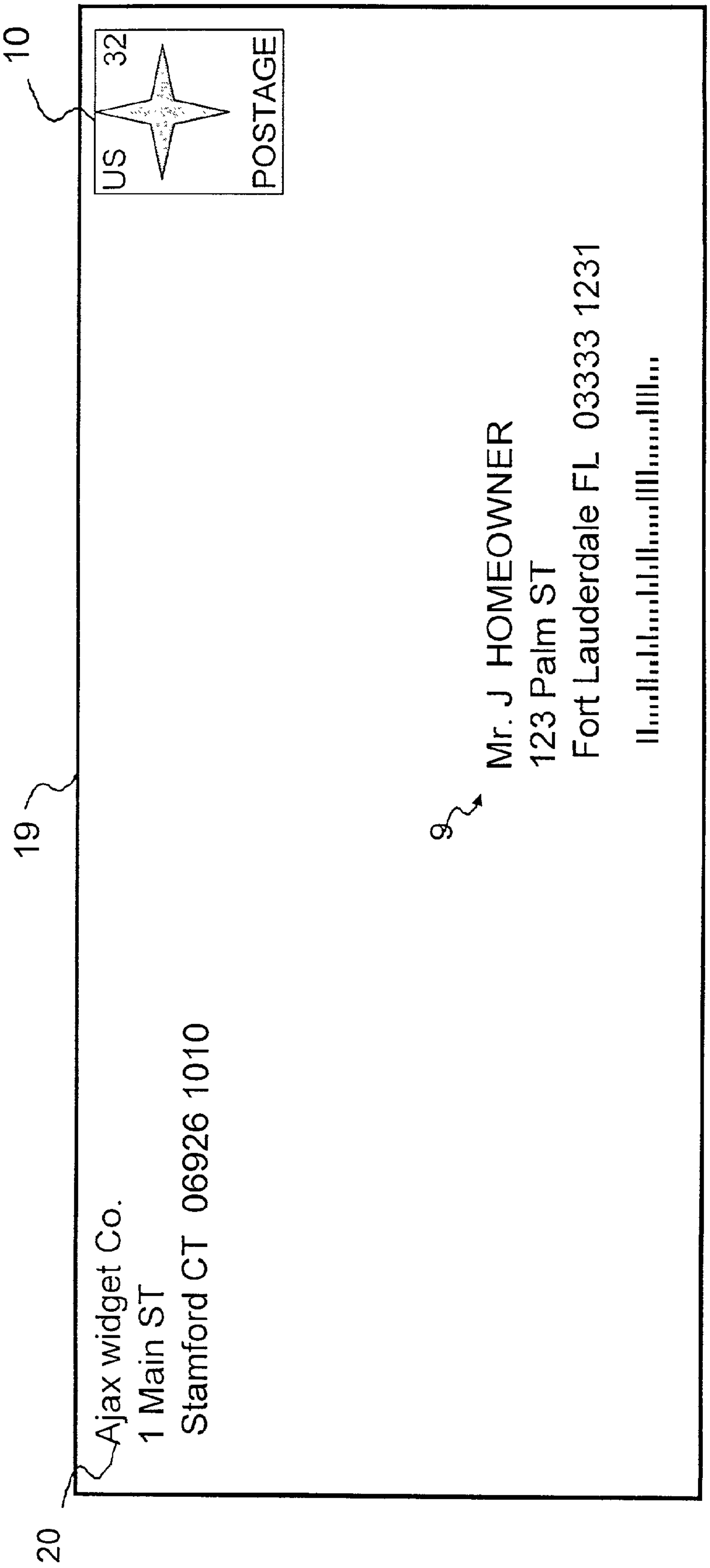
FIG. 1C is a drawing of a stamped mailpiece.

FIG. 1C is a drawing of a stamped mailpiece. Mailpiece 19 has a sender address field 20, a recipient address field 9 and a stamp 10.

Figure 1D:
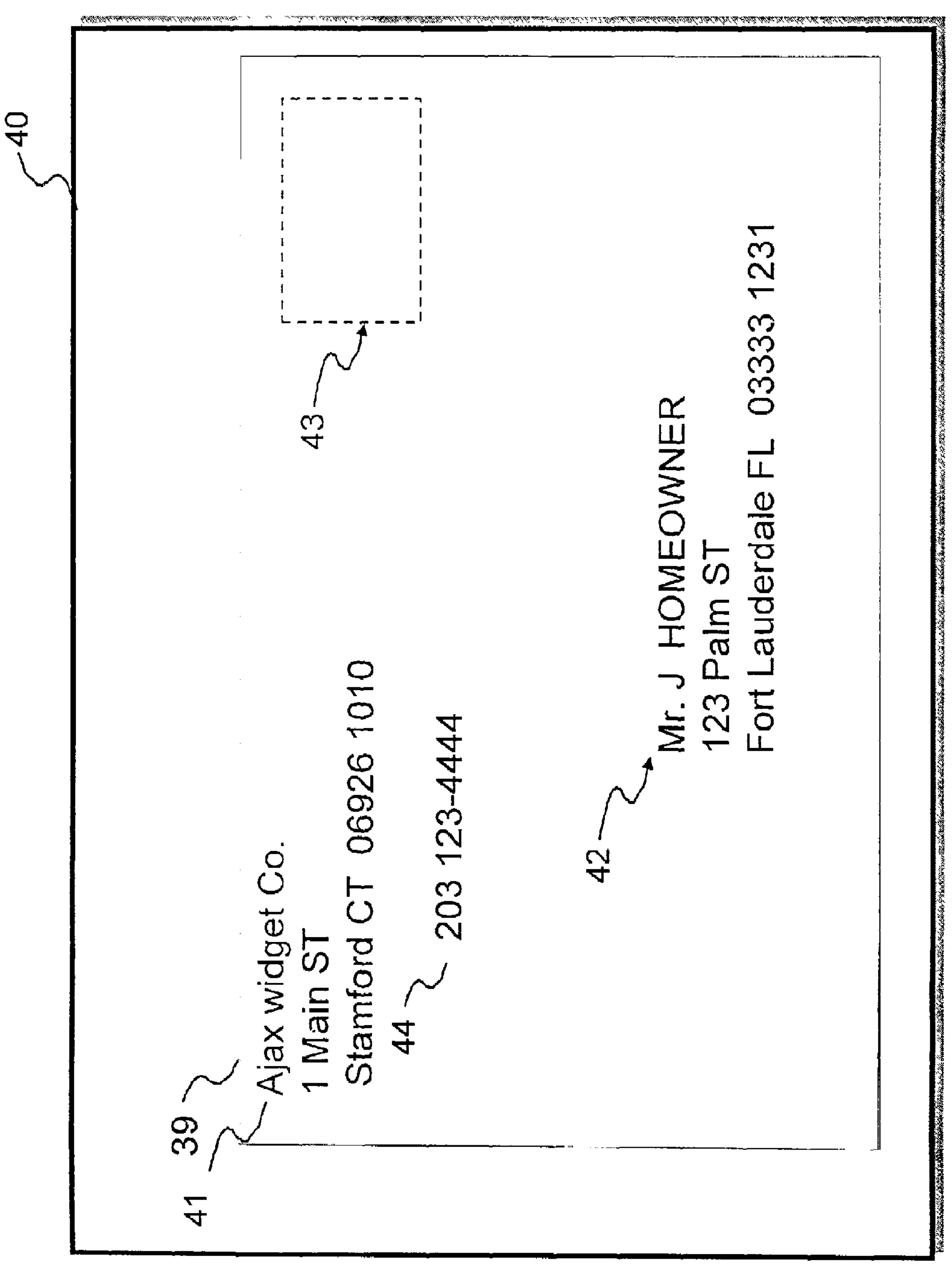
FIG. 1D is a drawing of a flat or package that is going to be delivered by a carrier.

FIG. 1D is a drawing of a flat or package that is going to be delivered by a carrier. Package 40 has a label 39 affixed thereto. Label 39 has a sender address field 41, a recipient address field 42 and may have other sender information, e.g., the sender's phone number 44. Indicia 43 is affixed to label 39. Indicia 43 may be a postal indicia or courier symbology.

FIGS. 1A-1D show various methods of evidence for the payment of postage. It will be obvious to one skilled in the art that additional methods of evidence for the payment of postage exist.

Figure 2:
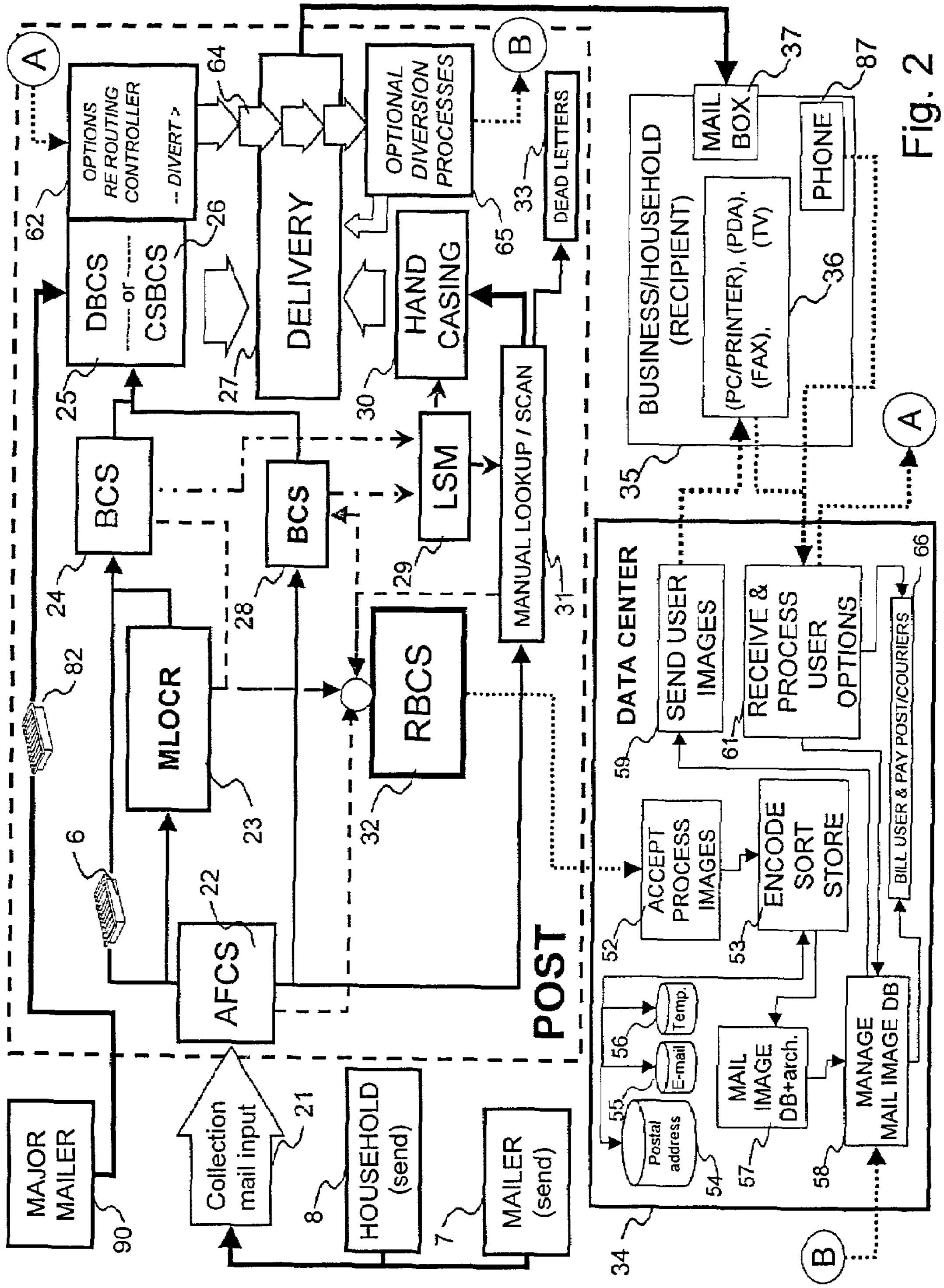
FIG. 2 is a drawing showing how this invention may be used by a post in the processing of letter mail.

FIG. 2 is a drawing showing how this invention may be used by a post in the processing of letter mail. Letter mail that is deposited in trays 6 and delivered to the post is read by multiple optical character reader ("MLOCR") 23. Collection letter mail may be; metered letter mail that is produced at a mailer site 7 or a sender household 8 by a postage meter or a personal computer meter; stamped mail; or permit mail. Collection letter mail is placed in collection mail input 21, e.g., mail boxes or delivered to the United States Postal Service unsorted. Collection letter mail is sent to advanced facer canceller ("AFCS") 22. AFCS 22 first faces the letter mail. Then AFCS 22 electronically identifies and separates prebarcoded mail, handwritten addresses and machine-imprinted address pieces for faster processing through automation. Letter mail that AFCS 22 determines is optical character readable is sent to MLOCR 23. MLOCR 23 reads the entire address on the letter mail: sprays a bar code on the mail; and then sorts the mail. Letter mail that is able to be scanned and sorted by MLOCR 23 is sent to bar code sorter/code printer ("BCS") 24. Letter mail that the mailer has prebarcoded and contains a facing identification mark is sent to a printer contained in BCS 24.

Trayed mail 82 (mail in which the sender is entitled to discounts) that is produced at a major mailer site 90 (FIG. 5) is sent to a delivery bar code sorter/code printer ("DBCS") 25 or a carrier sequence bar code sorter/code printer ("CSBCS") 26. Sorters 25 and 26 sort the letter mail in the order that the mail is going to be delivered by postal carrier 27. Letter mail that AFCS 22 determines is not optical character readable is sent to bar code sorter/code printer ("BCS")28. Letter mail that AFCS 22 determines is not optical character readable is sent to bar code sorter/code printer ("BCS") 28. Letter mail that AFCS 22 obtains electronic images from and letter mail that MLOCR 23 obtains electronic images from transfers the electronic images to RBCS 32. RBCS 32 matches the look up zip code for the letter mailpieces from AFCS 22 and merges them. RBCS 32 electronically transmits the bar code information to sorter 28 where the bar code information is sprayed on the mailpieces. Letter mail that is able to be scanned and sorted by sorters 24 and 28 is sent to DBCS 25. Sorters 25 and 26 sort the letter mail in the order that the mail is going to be delivered by postal carrier 27, or hold the mail for recipient diversion for a specified period of time in divert mail options rerouting controller 62.

Letter mail that can not be scanned and sorted by sorters 24 and 28 is sent to LSM 29. Letter mail that can be sorted by LSM 29 is sent to hand casing 30. Hand casing 30 is the process in which the postal carrier sorts the letter mail in the order that the letter mail is going to be delivered by postal carrier 27. Letter mail that can not be sorted by LSM 29 is sent to manual process 31. Manual lookup/scan 31 attempts to classify the previously rejected letter mailpiece to redirect the mailpiece; declare the mailpiece dead; or manually re-code the mailpiece for redelivery. Then the letter mailpieces that have not been processed in manual lookup, scan and sortation process 31 are sent to dead letters 33. In process 31, an operator may determine the address of the recipient and produce a label to be placed on the letter mail. Then the letter mail would go to postal hand casing 30 where the mail is sorted in the order that the mail is going to be delivered by postal carrier 27.

Letter mail that can not be faced and cancelled by AFCS 22 is sent to manual lookup/scan 31. Manual lookup/scan 31 attempts to classify the previously rejected letter mailpiece to redirect the mailpiece; declare the mailpiece dead; or manually recode the mailpiece for redelivery. Then the letter mail that manual process 31 is able to classify is sent to postal carrier hand casing 30 before it is delivered by postal carrier 27.

RBCS 32 electronically transmits the bar code information that represents the destination of the letter mailpiece and the party to whom the mailpiece is to be delivered and the image of the face of the mailpiece to data center 34. The aforementioned scanners scan all of the information appearing on the face of the letter mail, e.g., the sender's name and address 12 (FIG. 1A), the recipient's name and address 13 and postal indicia 14. The scanned information is transferred to accept process images 52. Then the information is sent to encode, sort, store 53. At this point, the recipient's physical address is verified by checking postal address data base 54, and the recipient's e-mail address is determined from e-mail data base 55. Temporary data base 56 is then searched to determine whether or not the recipient has left any forwarding addresses. Encode, sort, store 53 then encodes and sorts the information obtained from data bases 54, 55 and 56.

The aforementioned encoded and sorted information is stored in mail image data base+archive 57. Then the mail image information is sent to manage mail image db 58 where the various options and the costs associated therewith that the recipient may have for delivering the information contained in the letter mail are determined. Then the mail images and options that the recipient has for receiving the letter mail are sent to send user images 59, where the information appearing on the face of the letter mail in alphanumeric and graphic form and the options in alphanumeric and graphic form, the recipient has for receiving the letter mail is transmitted to receiving device 36 (personal computer, television, facsimile machine, personal data assistant, etc.), which is located at the recipient's business or household 35. Device 36 also may be a mobile device located with the recipient for use outside the recipient's business or household 35. The options that the recipient has for diverting the letter mail are described in the description of FIG. 4.

The recipient may use device 36 (personal computer, facsimile machine, personal data assistant, etc.) located at the recipient's business or household 35 to inform, receive and process user options 61, located at data center 34, of the manner in which the letter mail should be delivered. The recipient may also use a touch tone and/or voice telephone 87 to inform receive & process user options 61 of the manner in which the recipient would like the letter mail displayed on the receiving device 36, e.g., television delivered. For instance, the recipient may want the letter mail physically delivered to the recipient's house faster or slower, or the letter mail physically redirected to the recipient's temporary address, or physically delivered to the recipient's agent, or physically delivered to the recipient's attorney, or physically returned to the mailer, or have the post open the letter mail and have the post e-mail or fax the contents of the letter mail to the recipient and/or parties designated by the recipient.

At this juncture, the recipient may inform options 61 via a device 36 of the manner in which the recipient would like the letter mail processed. Options 61 will then inform the recipient via device 36 of the cost to the recipient to process the letter mail in the manner selected by the recipient. The recipient may then inform the post to deliver the letter mail in the manner selected by the recipient. The recipient's selected manner of letter mail processing is forwarded to options rerouting controller 62. If the post specified time to deliver the letter mail has not been reached, the letter mail is sent to recipient options 64 and delivered in the manner selected by the recipient in optional diversion processes 65. Then optional diversion processes 65 informs manage mail image data base 58 to archive the image and also to notify bill user and pay post couriers 66 to bill the recipient and pay the post. At this point, the next letter mail image is ready to be processed.

The letter mail may then be delivered to the recipient at mail box 37 at a faster or slower rate than that selected by the sender; held by the post for a specified amount of time and then delivered to an address specified by the recipient; opened, and the contents of the letter mail faxed to recipient-selected fax numbers; opened, and the contents of the letter mail faxed to recipient-selected fax numbers, and then the letter mail may be delivered to the physical address specified by the recipient; opened, and the contents of the letter mail e-mailed to recipient-selected e-mail addresses; or opened, and the contents of the letter mail e-mailed to recipient-selected e-mail addresses, and then the letter mail may be delivered to the physical address specified by the recipient. The recipient may also have instructed the post to return the mail to the sender, to destroy the mail, or to recycle the paper in the letter mail. Receive & process user options 61 will also send the cost of the recipient selected manner of delivery to bill user & pay post/couriers 66 so that data center 34 may inform the post to debit the recipients account or send a bill to the recipient.

Figure 3:
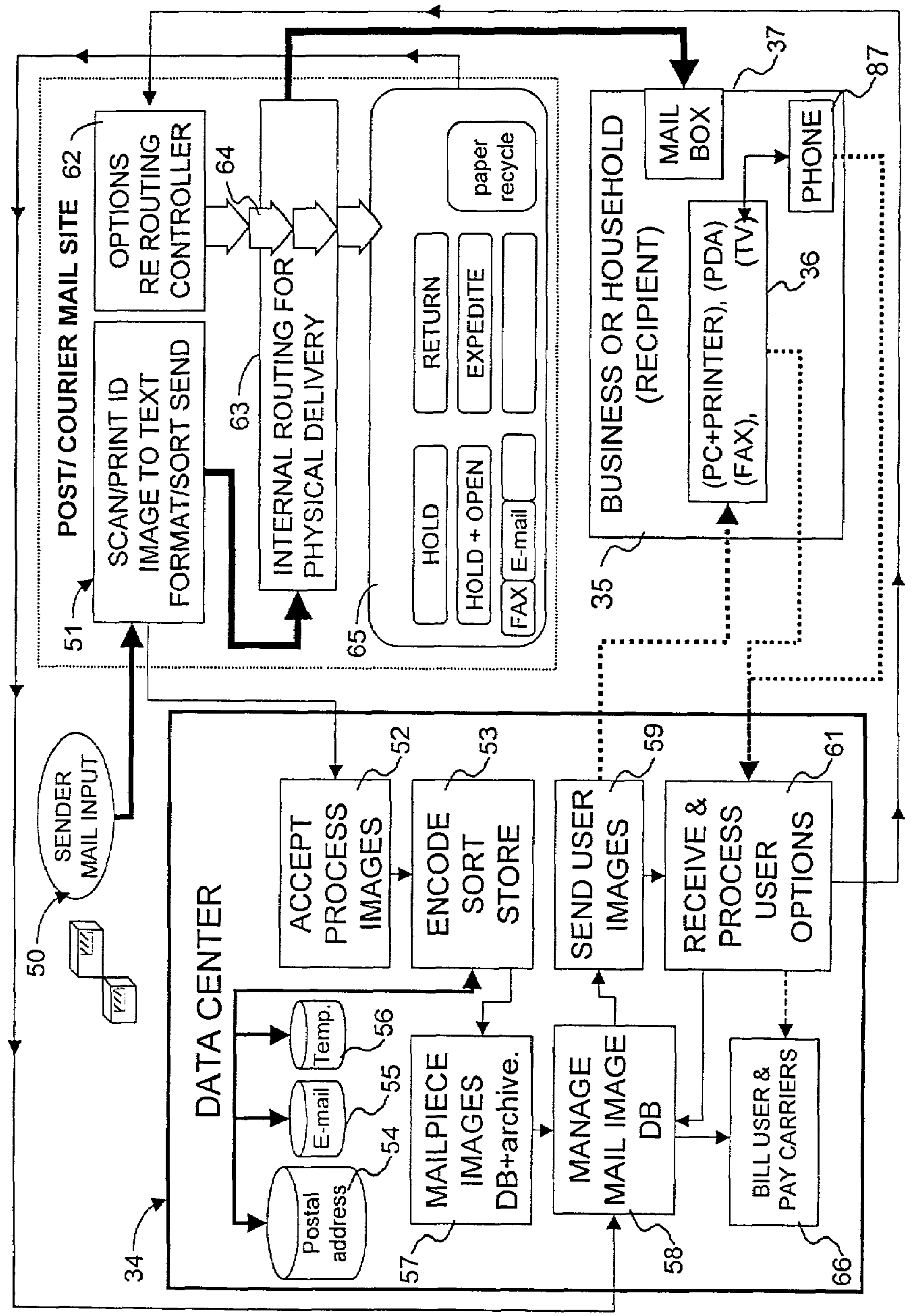
FIG. 3 is a drawing showing how this invention may be used by the post and/or a courier in the processing of flats and packages.

FIG. 3 is a drawing showing how this invention may be used by a post or courier in the processing of packages and flats. Packages and flats that are deposited with the carrier at sender mail input 50 are scanned by scan/print ID image to text format/sort send 51. Scan/print ID image to text format/sort send 51 scans all of the information appearing on the face of the package or flat, e.g., as in FIG. 1D, the sender's address 41, the sender's phone number 44, the recipients address 42 and courier symbology 43. The scanned information is coded, formatted and sorted, and the physical flat or package is sent to internal routing for physical delivery of the package or flat 63. The aforementioned information is transferred to accept process images 52, which is located at data center 34. Then the information is sent to encode, sort, store 53. At this point, the recipient's physical address is verified by checking postal address 54, and the recipient's e-mail address is determined from e-mail 55. Temp. 56 is then searched to determine whether or not the recipient has left any forwarding addresses. Encode, sort, store 53 then encodes and sorts the information obtained from data centers 54, 55 and 56.

The aforementioned encoded and sorted information is stored in mailpiece images DB+archive 57. Then the package or flat image information is sent to manage mail image DB 58 where the various options and the costs associated therewith that the recipient may have for delivering the information contained in the package or flat are determined. Then the mail images and options that the recipient has for receiving the package or flat are sent to send users images 59, where the information appearing on the face of the package or flat in alphanumeric and graphic form and the options in alphanumeric and graphic form the recipient has for receiving the package or flat are transmitted to receiving device 36 (personal computer, television, facsimile machine, personal data assistant, etc.), which is located at the recipient's business or household 35. The recipient may use device 36 (personal computer, facsimile machine, personal data assistant, etc.) located at the recipient's business or household 35 to inform, receive, and process user recipient options 61, located at data center 34, of the manner in which the package or flat should be delivered. The recipient may also use a touch tone and/or voice phone 87 to inform receive & process user options 61 of the manner in which the recipient would like the package or flat displayed on the receiving device 36, e.g., television delivered. For instance, the recipient may want the package or flat physically delivered to the recipient's house faster or slower, or the package or flat physically redirected to the recipient's temporary address, or physically delivered to the recipient's agent, or physically delivered to the recipient's attorney, or physically returned to the mailer, or have the post open the package or flat and have the post email or fax the contents of the package or flat to the recipient and/or parties designated by the recipient.

At this juncture, the recipient may inform receive & process user options 61 via a device 36 of the manner in which the recipient would like the package or flat processed. Receive & process user options 61 will then inform the recipient via device 36 of the cost to the recipient to deliver the package or flat in the manner selected by the recipient. The recipient may then inform the carrier to deliver the package or flat in the manner selected by the recipient. The recipient's selected manner-specified time to deliver the package or flat has not been reached or the package or flat is at internal routing for physical processing 63, the package or flat will be sent to options re-routing controller 62 and delivered in the manner selected by the recipient in route mail options 65. Then route mail options 65 informs manage mail image data base 58 to archive the image and also to notify bill user & pay carriers 66 to bill the recipient and pay the carrier. At this point, the next package or flat image is ready to be processed.

The package or flat may then be delivered to the recipient at mail box 37 at a faster or slower rate than that selected by the sender; held by the courier for a specified amount of time and then delivered to an address specified by the recipient; opened, and the contents of the package or flat faxed to recipient selected fax numbers; opened and the contents of the package or flat faxed to recipient-selected fax numbers, and then the package or flat may be delivered to the physical address specified by the recipient; opened, and the contents of the package or flat e-mailed to recipient-selected e-mail addresses; or opened, and the contents of the package or flat e-mailed to recipient-selected e-mail addresses, and then the package or flat may be delivered to the physical address specified by the recipient. The recipient may also have instructed the post or courier to return the mail to the sender or to destroy the contents of the package or flat or recycle the contents of the package or flat. Receive & process user options 61 will also send the cost of the recipient-selected manner of delivery to bill user & pay carriers 66 so that the carrier may debit the recipient's account or send a bill to the recipient.

Figure 4:
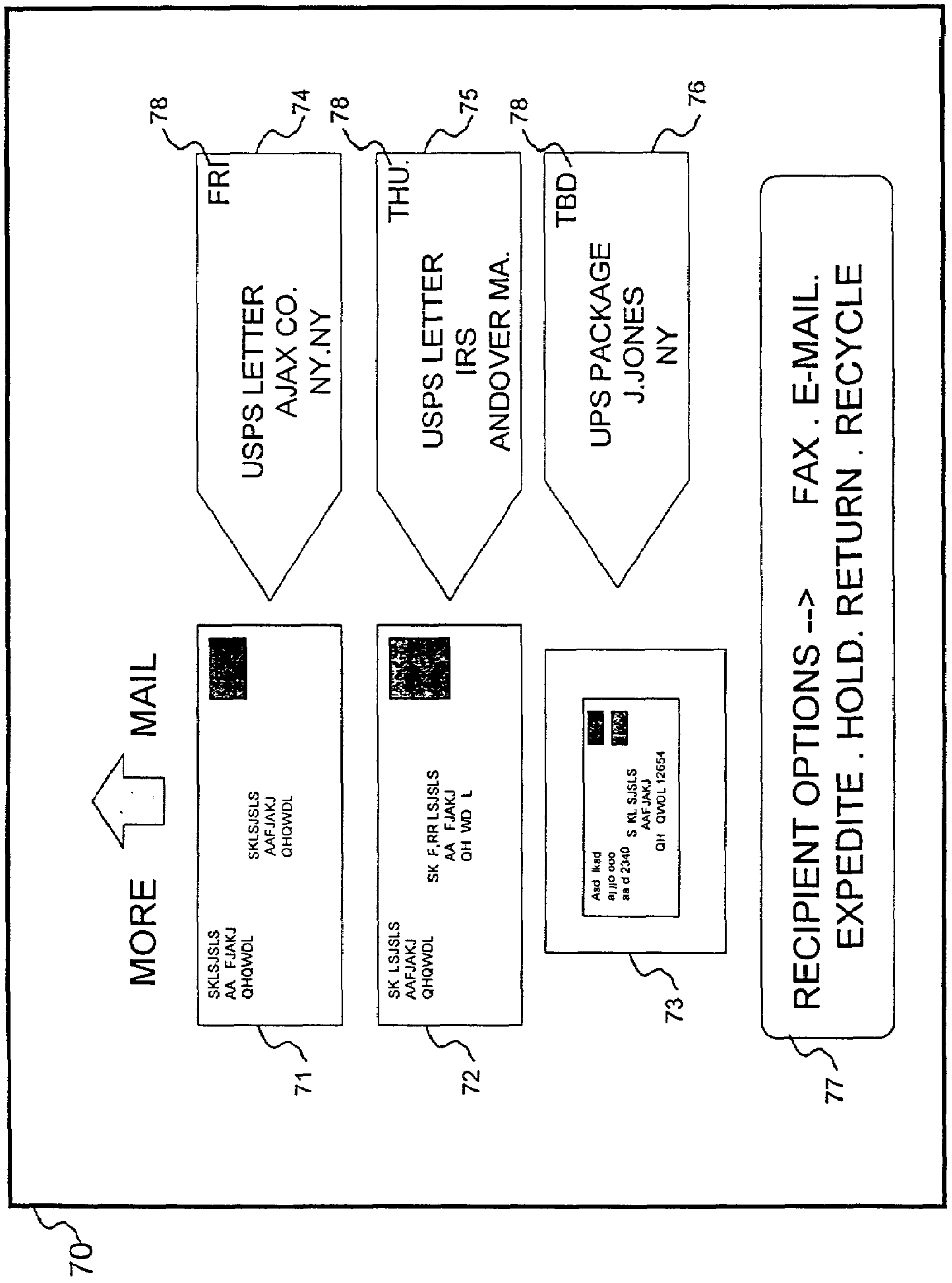
FIG. 4 is a drawing of the information that appears on one or more of receiving devices 36 and FIG. 5 is a drawing of major mailer site 90.

FIG. 4 is a drawing of the information that appears on one or more of receiving devices 36. The information may appear on the display of a personal computer, the screen of a television set, or paper 70 printed by a printer or facsimile machine. An image of the face of a letter mailpiece is shown at 71 and 72, and an image of the face of a flat or package is shown at 73. Data associated with letter mailpiece 71 is shown at 74, and data associated with letter mailpiece 72 is shown at 75. Data associated with package or flat 73 is shown at 76. The options that the recipient has for diverting the mail is shown at 77, and the time that the recipient would like delivery is shown at 78. It would be obvious to one skilled in the art that additional services other than those shown at 77 may be added. It will also be obvious when the recipient clicks on one of the items in 77 the carrier will have a record of the item clicked on, so that a work order and receipt record may be established.

Figure 5:
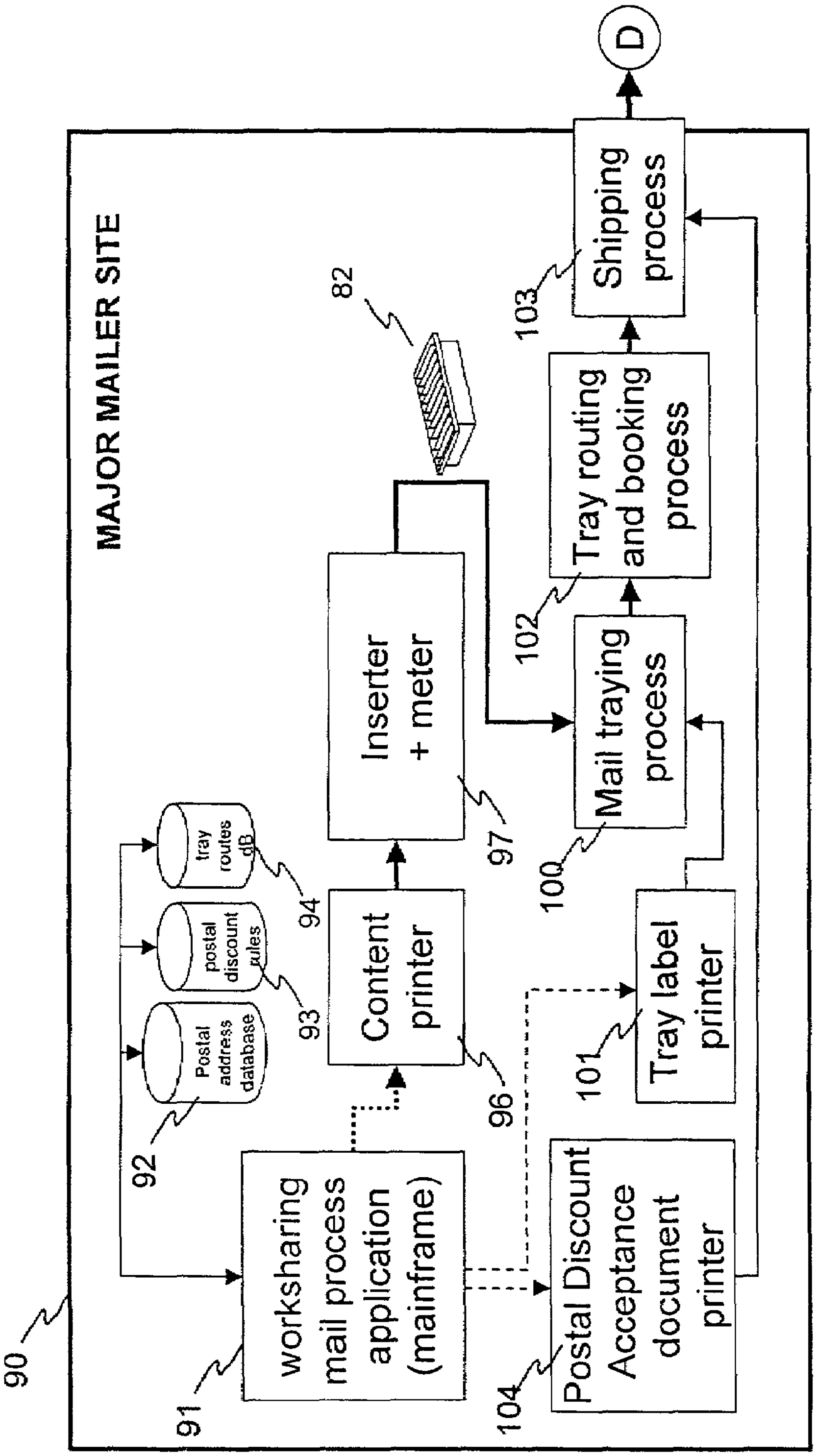

FIG. 5 is a drawing of major mailer site 90 that is used in the production of mailpieces for trays 82 (shown in FIG. 2). A worksharing mail process application mainframe 91 is located at site 90. Mainframe computer 91 performs preprocessing of the letter mailpiece by controlling the content and composition of the letter mailpiece as well as the address management, presortation postal requirements and postal process bar code requirements. Computer 91 is coupled to postal address data base 92, postal discount rules 93, and tray routes db 94. Mainframe 91 utilizes postal address database 92, postal discount rules 93, and tray routes dB 94 to instruct content printer 96 to print the material that is required for the mailing, e.g., information appearing on the face of the letter mailpiece, and material that is going to be inserted into the mailpiece. Inserter+meter 97 inserts the material into the correct mailpiece, seals the mailpiece, applies the correct postage to the mailpiece, places the mailpiece in the proper tray 82 and prepares documentation for the mailpieces in tray 82. Mainframe 91 will cause tray label printer 101 to print a label according to mail traying process 100 for the tray 82 that inserter+meter 97 is filling. Then tray 82 containing the letter mailpieces goes to tray routing and booking process 102 and shipping process 103. When tray 82 is in shipping process 103, postal discount acceptance document printer 104 will be instructed by computer 91 to print the proper postal documentation for the letter mailpieces in tray 82. After postal discount rules 93 places the proper documentation in tray 82, tray 82 is ready to be shipped to DBCS 25 or CSBCS 26 (FIG. 2).

The above specification describes a new and improved method that enables a recipient to inform a carrier of the manner in which the recipient would like the mail delivered. It is realized that the above description may indicate to those skilled in the art additional ways in which the principles of this invention may be used without departing from the spirit. Therefore, it is intended that this invention be limited only by the scope of the appended claims.

What is claimed is:

1. A method that enables a recipient to inform a carrier of the manner in which the recipient wants some or all of their mail delivered, said method comprises the steps of:

depositing by the sender with the carrier mail containing the recipient's name and physical address and a sender's name and address;

capturing by the carrier the name and physical address of the recipient and the sender;

translating by a data center the name and physical address of the recipient into an e-mail address;

notifying by the data center to the recipient of the availability of the deposited mail;

notifying by the recipient to the data center of the manner in which the recipient wants some or all of their mail delivered;

notifying by the data center to the carrier of the manner in which the recipient wants the mail delivered; and delivering mail by the carrier to the recipient in the manner specified by the recipient to the carrier.

2. The method claimed in claim 1, wherein the recipient notifies the carrier to deliver the mail to a specified name and address.

3. The method claimed in claim 1, wherein the recipient notifies the carrier to return the mail to the sender.

4. The method claimed in claim 1, wherein the recipient notifies the carrier to open the mail.

5. The method claimed in claim 4, further including the steps of:

informing the carrier to extract the contents of the mailpiece to the recipient; and mailing by e-mail the information included in contents of the mailpiece to the recipient.

6. The method claimed In claim 4, further including the steps of:

informing the carrier to extract the contents of the mailpiece to one or more specified e-mail addresses; and mailing by e-mail the information included in contents of the mailpiece to the specified e-mail addresses.

7. The method claimed in claim 4, further including the steps of:

informing the carrier to extract the contents of the mailpiece to the recipient; and sending the information contents of the mailpiece to the recipient's personal data assistant.

8. The method claimed in claim 4, further Including the steps of:

informing the carrier to extract the contents of the mailpiece to the recipient; and reading the information contents of the mailpiece to the recipient via telephone.

9. The method claimed in claim 4, further including the steps of:

informing the carrier to send by facsimile the contents of the mailpiece to the recipient; and mailing by facsimile the contents of the mailpiece to the recipient.

10. The method claimed in claim 4, further including the steps of:

informing the carrier to facsimile the contents of the mailpiece to one or more specified facsimile numbers; and sending by facsimile the contents of the mailpiece to the specified facsimile numbers.

11. The method claimed in claim 1, wherein the recipient notifies the carrier to deliver the mail to the recipient at a different address.

12. The method claimed in claim 1, wherein the recipient notifies the carrier to deliver the mail to the recipient by a slower delivery method than that paid for by the sender.

13. The method claimed in claim 1, wherein the recipient notifies the carrier to deliver the mail to the recipient by a faster delivery method than that paid for by the sender.

14. The method claimed in claim 1, further including the step of:

charging the recipient for receiving notification of the availability of the deposited mail.

15. The method claimed in claim 1, further including the step of:

charging the recipient for delivering mail to the recipient In the manner specified by the recipient to the carrier.

16. The method claimed in claim 1, further including the step of:

charging the recipient for receiving notification of the availability of the deposited mail; and charging the recipient for delivering mail to the recipient in the manner specified by the recipient to the carrier.

17. The method claimed in claim 1, further including the step of:

informing the sender of the delivery of the mail.

18. The method claimed in claim 1, wherein the recipient notifies the carrier to hold the mail for a specified period of time.

19. The method claimed in claim 1, wherein the recipient notifies the carrier to destroy the mail.

20. The method claimed in claim 1, wherein the recipient notifies the carrier to recycle the material comprising the mail.

21. The method claimed in claim 1, wherein the recipient is notified via e-mail of the availability of the deposited mail.

22. The method claimed in claim 1, wherein the recipient is notified via telephone of the availability of the deposited mail.

23. The method claimed In claim 1, wherein the recipient is notified via facsimile of the availability of the deposited mail.

24. The method claimed in claim 1, wherein the recipient is notified via television of the availability of the deposited mail.

25. The method claimed in claim 1, wherein the carrier is notified via e-mail of the manner in which the recipient wants the mail delivered.

26. The method claimed in claim 1, wherein the carrier is notified via facsimile of the manner in which the recipient wants the mail delivered.

27. The method claimed in claim 1, wherein the carrier is notified via telephone of the manner in which the recipient wants the mail delivered.

28. The method claimed in claim 1, wherein the recipient notified a data center who notifies the carrier of the manner in which the recipient wants the mail delivered.

29. The method claimed in claim 1, wherein the mail deposited with the carrier contains a graphic.

30. The method claimed in claim 29, wherein the graphic is a stamp.

31. The method claimed in claim 29, wherein the graphic is a postal indicia.

32. The method claimed in claim 29, wherein the graphic is a permit.

33. The method claimed in claim 29, wherein the graphic is carrier symbology.

34. The method claimed in claim 29, wherein the graphic is captured and translated.

35. The method claimed in claim 29, wherein the graphic is stored.

* * * * *